(12) United States Patent
Anderson

(10) Patent No.: US 10,759,586 B1
(45) Date of Patent: Sep. 1, 2020

(54) CONTAINER FOR STORING AND DISPENSING PACKETS OF EDIBLE ITEMS

(71) Applicant: Frederick Anderson, White Lake, NY (US)

(72) Inventor: Frederick Anderson, White Lake, NY (US)

(*) Notice: Subject to any disclaimer, the term of this patent is extended or adjusted under 35 U.S.C. 154(b) by 0 days.

(21) Appl. No.: 16/244,280

(22) Filed: Jan. 10, 2019

(51) Int. Cl.
| | | |
|---|---|---|
| *B65D 81/18* | (2006.01) | |
| *B65D 25/04* | (2006.01) | |
| *B65D 25/28* | (2006.01) | |
| *A23L 27/00* | (2016.01) | |

(52) U.S. Cl.
CPC ............ *B65D 81/18* (2013.01); *B65D 25/04* (2013.01); *B65D 25/2867* (2013.01); *A23L 27/00* (2016.08); *A23V 2002/00* (2013.01)

(58) Field of Classification Search
USPC ........................................ 221/150 HC, 150 R
See application file for complete search history.

(56) References Cited

U.S. PATENT DOCUMENTS

| | | | | |
|---|---|---|---|---|
| 4,500,145 A | * | 2/1985 | Fassauer | A47G 19/26 221/197 |
| 4,899,906 A | | 2/1990 | Bella | |
| 4,941,327 A | * | 7/1990 | Miles | A47F 1/06 221/150 R |
| 6,269,285 B1 | * | 7/2001 | Mignault | A47F 1/06 206/745 |
| 6,758,370 B2 | | 7/2004 | Cooke et al. | |
| 2008/0093376 A1 | * | 4/2008 | Balkin | G07F 11/08 221/150 R |

* cited by examiner

*Primary Examiner* — Gene O Crawford
*Assistant Examiner* — Ayodeji T Ojofeitimi
(74) *Attorney, Agent, or Firm* — Sanchelima & Associates, P.A.; Christian Sanchelima; Jesus Sanchelima

(57) ABSTRACT

The present invention relates to a container of storing packets of edible items. The container comprises a plurality of compartments for storing one kind of packet in each compartment, the compartments having an opening configured thereon; a lid having a handle, the lid being configured to selectively facilitate a ejection of at least one packet when the handle is operated by a user; and a biasing means configured at an operative bottom edge of the plurality of compartments, the biasing means configured to provide an upward push to the packets, thereby facilitating the ejection of the packets from the opening when the handle is operated by the user.

14 Claims, 4 Drawing Sheets

CONTAINER FOR STORING AND DISPENSING PACKETS OF EDIBLE ITEMS

BACKGROUND OF THE INVENTION

1. Field of the Invention

The present disclosure relates to the field of containers. In particular, the present invention relates to a container that facilitates vending of edible item packets.

2. Description of the Related Art

Nowadays, packaged edible food items such as condiments, jams, and the like are available in the form small packets or sachets. Such a packaging allows one to carry these food items in required quantities on the go, instead of carrying the conventional bottles thereof. However, storing these condiments in the house hold kitchens or restaurants is typically an extremely difficult task, since the small size of the sachets can be a cause of inadvertent mix ups. Hence, there is felt a need for storing these food item sachets in an organized manner.

Several designs for food vending machines have been designed in the past. None of them, however, are known to be provide an organized storage of food items that have been pre-packed in the form of small sachets, e.g., jams, condiments, and the like.

Applicant believes that a related reference corresponds to U.S. Pat. No. 6,758,370 filed by BRIAN COOKE, et al. The Cooke reference discloses a dispensing mechanism provided for flat faced products. The products are supported in a storage chute between a first upright wall and a second upright wall, stacked one on top of another. The chute has a discharge opening from which the product can be discharged. The dispensing mechanism described in the Cooke reference, however, fails to disclose a method for organizing and dispensing different kinds of sachets.

Another related application is U.S. Pat. No. 4,899,906 filed by LUIGI D. BELLA. The Bella reference discloses a dispenser that contains a rotary magazine comprising a plurality of radial sectors, each containing plates of food stacked on the top of each other. The dispenser described in the Cooke reference, however, fails to disclose a method for organizing and dispensing different kinds of sachets.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a container for storing food item packets in an organized manner.

It is yet another object of the present invention to provide a container for storing food item packets in an organized manner, in which the food items can be refrigerated.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
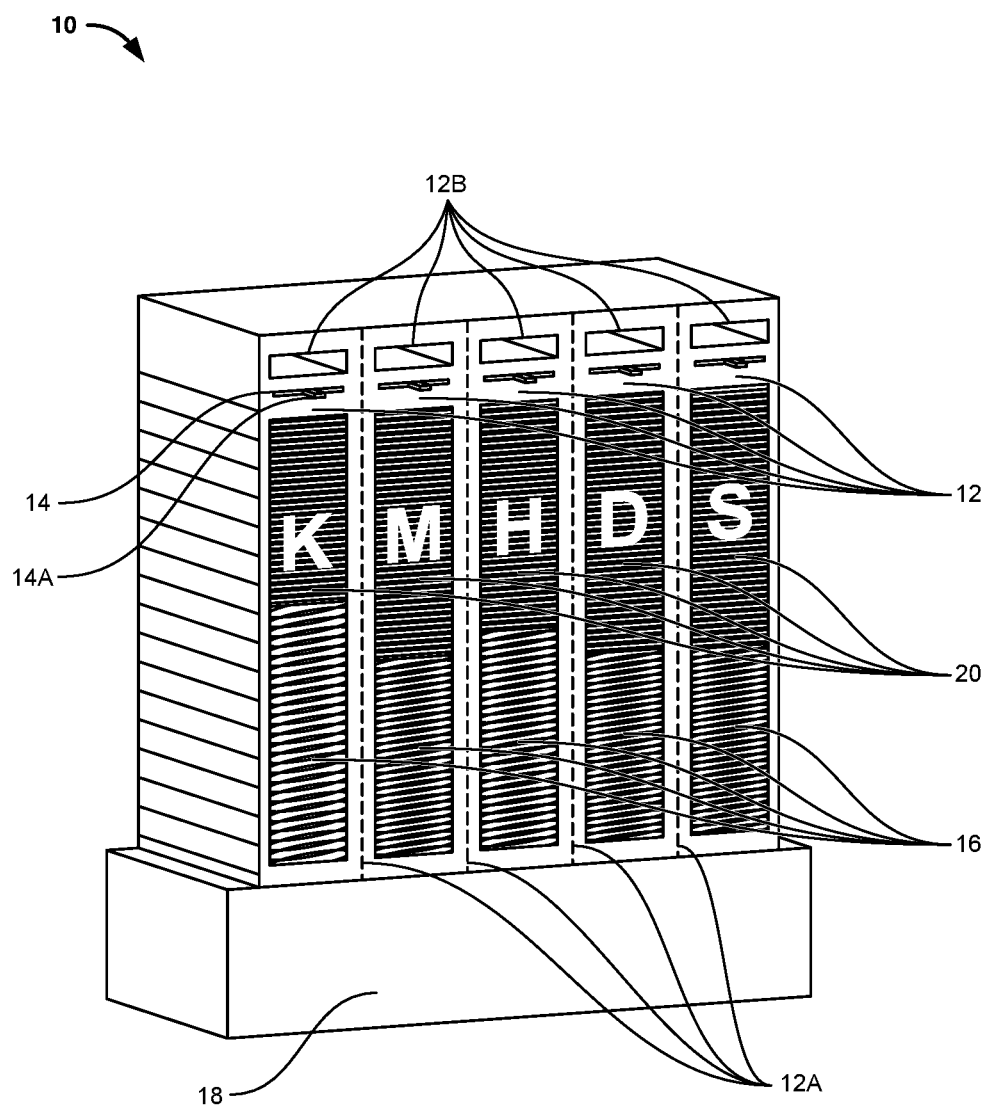
FIG. 1 illustrates an isometric view of a container for storing and dispensing packets of edible items 10, in accordance with an embodiment of the present invention, wherein the container 10 comprises a plurality of compartments 12, a lid 14, a biasing means 16, and a refrigeration unit 18.
Figure 2:
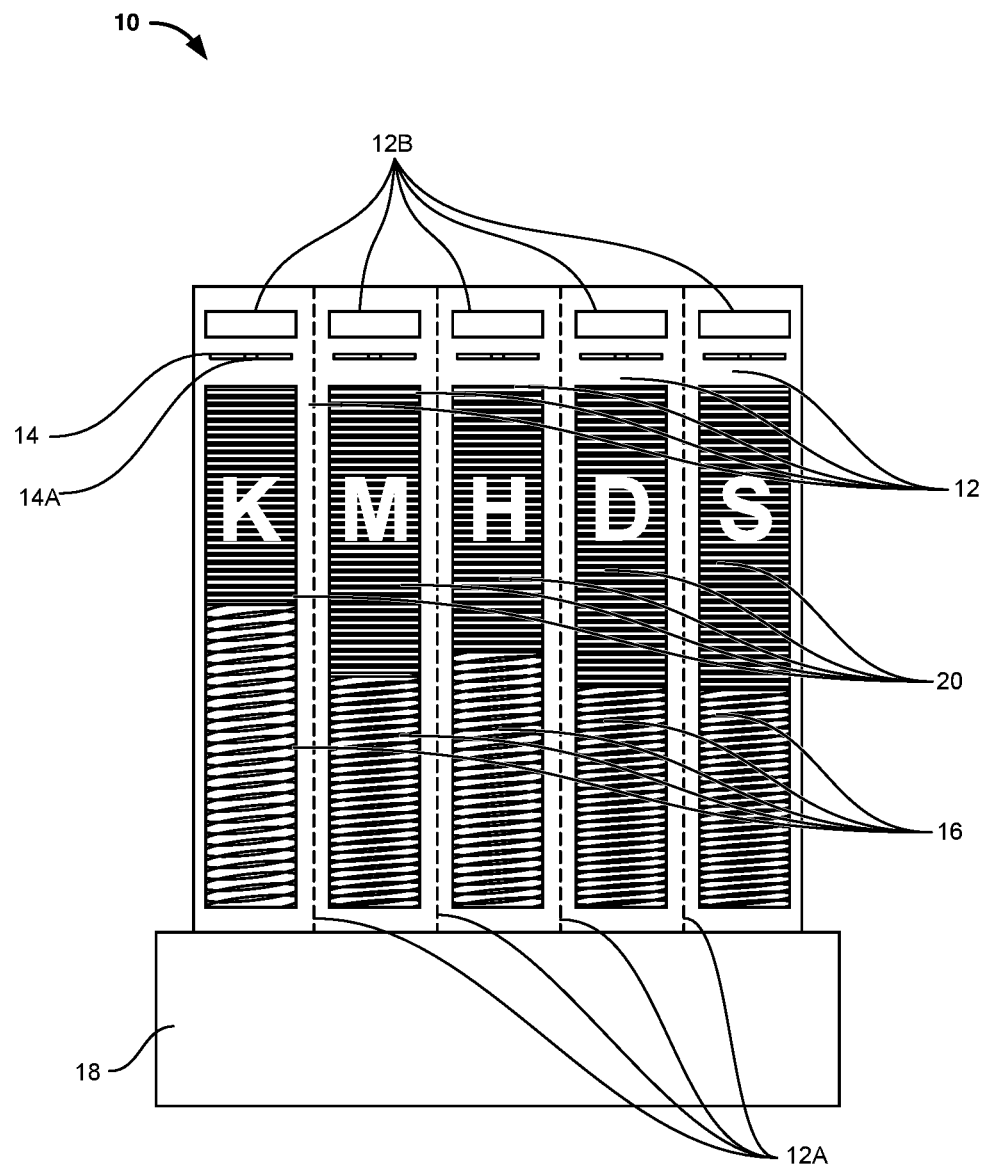
FIG. 2 illustrates a front view of the container 10, in accordance with an embodiment of the present invention.
Figure 3:
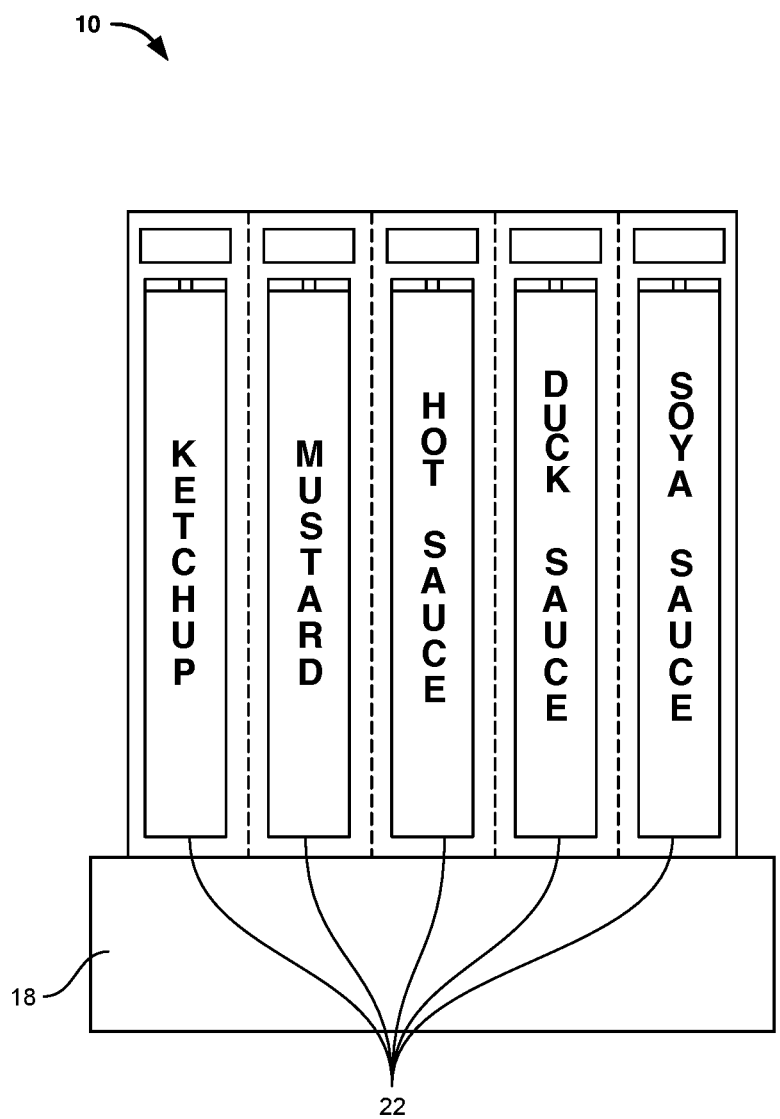
FIG. 3 illustrates a rear view of the container 10, in accordance with an embodiment of the present invention.

Referring now to FIGS. 1-3, where the present invention is generally referred to with numeral 10, it can be observed that a container for storing and dispensing packets of edible items 10 (hereinafter referred to as container 10), in accordance with an embodiment of the present invention, container 10 comprises a plurality of compartments 12, a lid 14, a biasing means 16, and a refrigeration unit 18.

The container 10 is defined sidewalls, i.e., the sidewalls are constructed in a manner so as to define a housing having a rectangular profile. The container 10 comprises the plurality of compartments 12. More specifically, the container comprises a plurality of separation barriers 12A disposed therewithin to define the plurality of compartments 12.

The number of compartments 12 can be as per the application requirements. In a domestic setting, the number of compartments can be, for example, ranging from three to five. However, in a restaurant, the container 10 can be provided with high number of compartments 12, wherein two or more compartments can be dedicated to dispense the same condiments, so that when the reloading of the compartments is done, reloading two or more compartments with the same condiment reduces the time and effort required to pre-arrange the condiments before loading into the compartments 12.

The compartments 12 further include a discharge opening 12B. The discharge opening 12B is the opening from where the packets of the edible items are dispensed. In the present disclosure, the packets are referenced as sachets 20. As seen in FIGS. 1 and 2, the sachets 20 are disposed within the compartments 12. In one example, the compartments 12 can be configured to contain sachets 20 of at least one of ketchup, hot sauce, duck sauce, mustard, soy sauce, and the like.

The container 10 further comprises lid 14 configured to cover the discharge opening 12B. The lid 14 had a handle 14A that, when operated, allows the user to selectively open the discharge opening 12B to facilitate the ejection of the sachet 20 from the compartment 12. In an embodiment, the lid is configured to thermally seal compartment 12.

The container 10 further comprises a biasing means 16 disposed in each of the compartments 12. The biasing means 16 is configured to provide an upward push to the sachets 20 placed within the compartments 12. Therefore, whenever a user operates the handle 14A to displace the lid 14, the discharge opening 12B is opened, and the upward push provided by the biasing means 16 facilitates the ejection of at least one sachet 20 from the compartment 12.

In on embodiment, the biasing means 16 is a spring. The biasing means 16 can be made of a metallic material or a non-metallic material. It is to be noted that according to the embodiments illustrated in FIGS. 1 thru 3, the biasing means 16 is a spring; however, the biasing means is not limited to being a spring. FIGS. 1 thru 3 illustrate one exemplary embodiment of the container in which the biasing means is a spring. In some other embodiments of container, hydraulic or pneumatic means can also be employed to perform the functionalities of the biasing means 16.

The container 10 further comprises a refrigeration unit 18. The refrigeration unit 18 is in thermal communication with the plurality of compartments for refrigerating the packets or sachets 20 stored inside the plurality of compartments 12. The refrigeration unit 18 can be any conventional refrigeration unit known in the art. The function of the refrigeration unit 18 is to provide a thermally suitable storage space within the compartments 12 to store the sachets 20 optimally.

FIG. 3 illustrates a rear view of the container 10. As seen in FIG. 3, the container 10 includes doors 22 that provide access to the compartments 12 so that the compartment 12 can be loaded with sachets 20. The doors 22 are configured to thermally seal the compartments 12 to prevent the atmospheric air enter the refrigerated space within the compartments 12.

Figure 4:
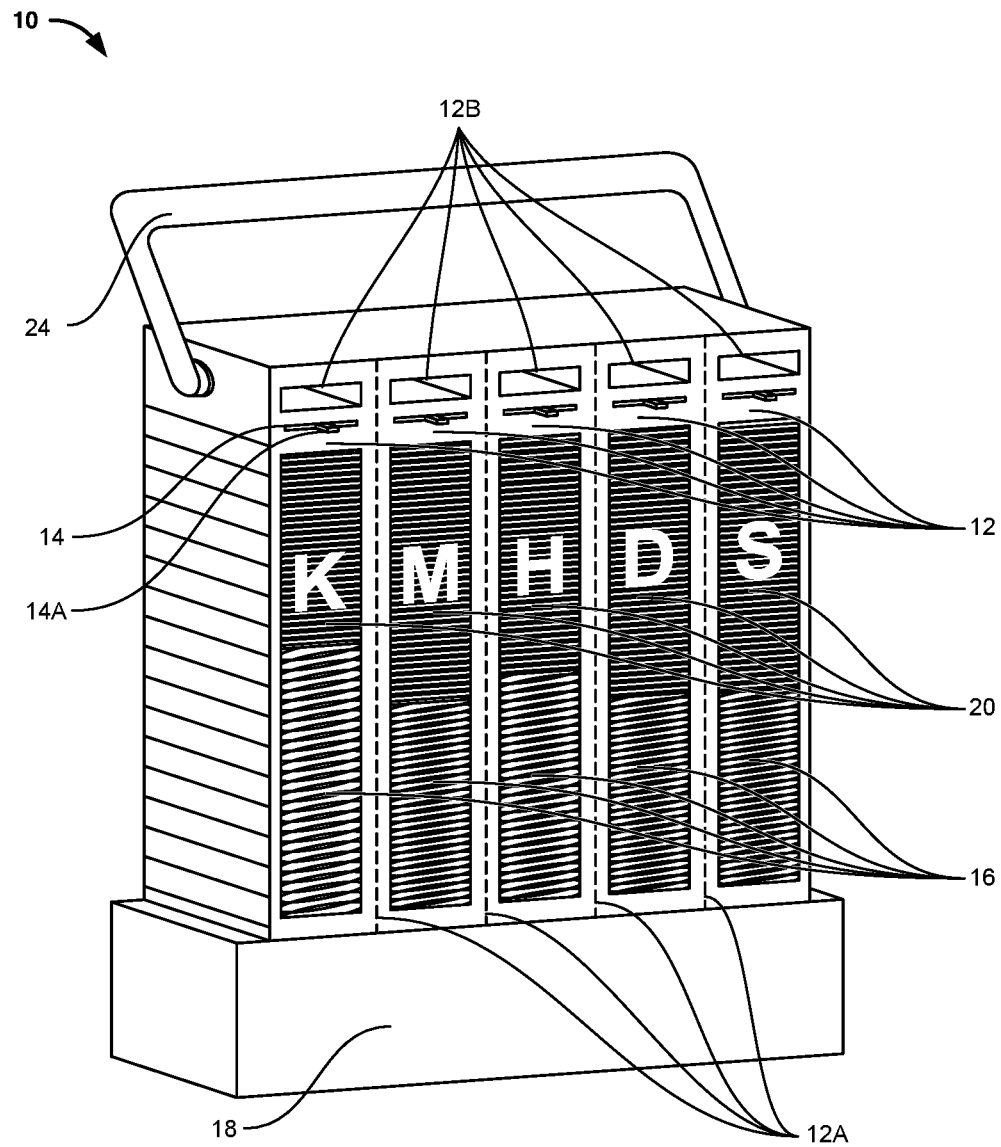
FIG. 4 illustrates an isometric view of a container 10, in accordance with another embodiment of the present invention

Another embodiment of the container 10 is illustrated in FIG. 4. The embodiment illustrated in FIG. 4 is the same as that explained with reference to FIGS. 1 thru 3; the only difference being that the container 10 illustrated in FIG. 4 includes a handle 24. As such, FIG. 4 is not elaborately described herein for the sake of brevity of the present disclosure. The handle 24 allows the user to easily lift or carry the container 10.

In accordance with one embodiment, the container 10 can also be decorated with stickers. Apart from a means for decoration, stickers can also be used help the users clearly identify the content in the sachet 20 in a particular compartment 12.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A container of storing packets of edible items, the container comprising:
 a. a plurality of compartments for storing one kind of packet in each compartment, the compartments having an opening configured thereon, each of said plurality of compartments having a discharge opening located entirely on a front end, said discharge opening being a cut portion that is rectangular in shape;
 b. a lid having a handle provided for each of said plurality of compartments, the lid being configured to selectively facilitate an ejection of at least one packet from said discharge opening when the handle is operated by a user, said lid located beneath said discharge opening, said lid separating said discharge opening from an interior space of said plurality of compartments; and
 c. a biasing means configured at an operative bottom edge of the plurality of compartments, the biasing means configured to provide an upward push to the packets, thereby facilitating the ejection of the packets from the opening when the handle is operated by the user.

2. The container of claim 1, further comprising a refrigeration unit in thermal communication with the plurality of compartments for refrigerating the packets stored inside the plurality of compartments.

3. The container of claim 1, wherein the edible items are condiments.

4. The container of claim 1, wherein the packets are in the form of sachets.

5. The container of claim 1, wherein the plurality of compartments are defined by separation barriers disposed within the container.

6. The container of claim 1, wherein the lid is configured to thermally seal the compartment in an assembled configuration thereof.

7. The container of claim 1, wherein the biasing means is a spring.

8. The container of claim 1, wherein the biasing means is made of either a metallic material or a non-metallic material.

9. The container of claim 1 wherein each of said plurality of compartments include a door located on a back end.

10. The container of claim 9 wherein said door provides access to a space within said plurality of compartments.

11. The container of claim 9 wherein said door is rectangular in shape and extends vertically along said back end of said plurality of compartments.

12. The container of claim 1 wherein said container includes a handlebar coupled to sidewalls of said container.

13. The container of claim 12 wherein said handlebar extends over a top end of said container, a space forming between said handlebar and said top end.

14. A system for a packet container dispenser, comprising:
 a. a plurality of packets having a condiment therein, wherein said condiments include ketchup, hot sauce, duck sauce, mustard, and soy sauce;
 b. a container having a front end, a rear end, and sidewalls to form a rectangular profile, wherein said container includes a plurality of compartments having separation barriers dividing each of said plurality of compartments, wherein said separation barriers have a vertical configuration, a discharge opening provided for each of said plurality of compartments, wherein said discharge opening is located near a top end of each of said plurality of compartments, wherein said discharge opening is accessed from a front side of each of said plurality of compartments, each of said discharge opening extending within said container, wherein said plurality of packets are dispensed from said discharge opening;
 c. a door provided for each of said plurality of compartments, said door located on said rear end of said container, wherein said door provides access to a space within said plurality of compartments, said door having a rectangular shape and extending vertically along said rear end of said container;
 d. a lid provided for each of said plurality of compartments, wherein said lid is located at said front side on each of said plurality of compartments beneath said discharge opening, wherein said lid covers said discharge opening, said lid including a handle extending outwardly from said front side which selectively opens said discharge opening to eject a packet of said plurality of packets from said discharge opening, wherein said lid thermally seals each of said plurality of compartments;

e. a biasing component provided as a spring located within each of said plurality of compartments, wherein said biasing component provides an upward force to said plurality of packets;
f. a refrigeration unit coupled to a bottom end of said container, wherein said refrigeration unit is in thermal communication with said plurality of compartments; and
g. a handlebar mounted to said sidewalls of said container, said handlebar extending over a top end of said container.

* * * * *